United States Patent [19]
Gerritsen

[11] Patent Number: 5,009,484
[45] Date of Patent: Apr. 23, 1991

[54] DIFFRACTION GRATINGS HAVING HIGH EFFICIENCIES

[75] Inventor: Hendrik J. Gerritsen, Providence, R.I.

[73] Assignee: Advanced Environmental Research Group, Woolwich, Me.

[21] Appl. No.: 346,726

[22] Filed: May 3, 1989

[51] Int. Cl.⁵ .............................................. G02B 5/18
[52] U.S. Cl. ............................ 350/162.11; 350/162.2
[58] Field of Search .................. 350/162.11, 311, 370, 350/162.17, 162.23, 276, 277, 258, 162.12, 162.13, 162.16, 162.2, 162.18, 162.22, 162.24; 355/1

[56] References Cited

U.S. PATENT DOCUMENTS

| | | | |
|---|---|---|---|
| 3,585,121 | 6/1971 | Franks et al. | 350/162.2 |
| 4,746,192 | 5/1988 | Minagawa | 350/162.23 |
| 4,850,682 | 7/1989 | Gerritsen | 350/162.2 |

OTHER PUBLICATIONS

The Bell System Technical Journal 48, 1969.

Primary Examiner—Bruce Y. Arnold
Assistant Examiner—Tho Van Tran

[57] ABSTRACT

A diffraction grating structure in the form of a substrate having a grating portion at an input surface thereof and a solid portion at an output surface thereof. A plurality of diffracting elements are formed in the grating portion, the diffracting elements having grooves, the depths thereof depending on the wavelength of incoming radiation impinging on the diffraction elements. The diffracting elements are formed at a selected slant angle with reference to a direction orthogonal to the plane of the input surface of the grating portion of the structure. The incoming radiation is redirected through the grating structure in a selected direction so as to be effectively concentrated at a selected spatial region.

16 Claims, 3 Drawing Sheets

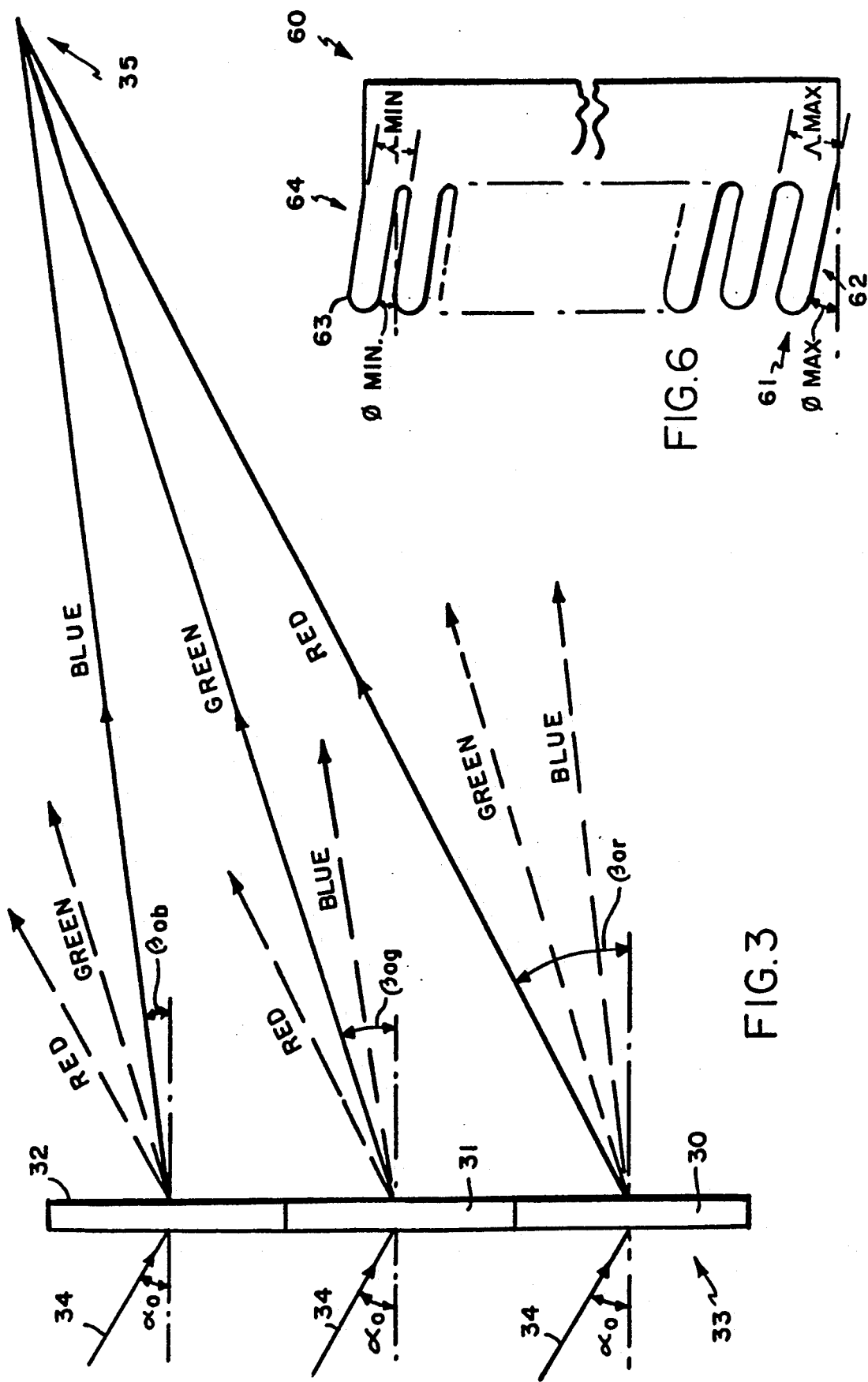

DIFFRACTION GRATINGS HAVING HIGH EFFICIENCIES

INTRODUCTION

This invention relates generally to diffraction grating structures and, more particularly, to such structures having relatively deep diffraction elements which are preferably arranged to be slanted at a selected angle with respect to the substrate on which they are formed so as to provide a grating having a relatively high diffraction efficiency in response to incident light over a relatively large range of incident angles and a selected range of wavelengths.

BACKGROUND OF THE INVENTION

Diffraction grating structures have been proposed for use in many applications. One such application that has recently been achieving particular significance is in the field of light directing devices. Such devices have been described, for example, in U.S. patent application Ser. No. 885,243 filed on July 14, 1986 by Gerritsen and Ser. No. 738,300 filed on May 28, 1985 by Gerritsen et al. Such devices are described, for example, for use in enhancing the lighting of interior rooms in response to incoming sunlight radiation, wherein it is desired to re-direct the incoming light, as received over a range of incident angles with respect to the device, through the device in a generally upward direction toward the ceiling toward the rear of the room, for example, even when the incident angle of the incoming light varies over a relatively wide range thereof.

While relatively shallow structures, in which the diffraction grating elements are substantially perpendicular to the grating structure substrate, have been found useful for such purpose, the overall diffraction efficiencies of such shallow grating structures have been found to be relatively low, reaching a substantially maximum efficiency when the angle of incidence equals the angle of diffraction. Thus, the capability of such structures to redirect impinging light through the diffracting structure over a wide range of incident angles in a specified range of diffraction directions has not been as effective as desired when the range of incident angles is relatively large.

It is desirable to be able to increase the diffraction efficiencies of such structures so as to maximize the light transmitted therethrough to as great an extent as possible as well as to assure that the light transmitted therethrough is re-directed in a selected direction such that it can be concentrated at a selected region of a room. Thus, the light being directed therethrough is considerably enhanced even when the angle of incidence of the incoming light varies over a relatively wide range of incident angles.

BRIEF SUMMARY OF THE INVENTION

In accordance with the invention, a diffraction grating structure is provided with diffraction grating elements wherein the grooves of the diffraction grating elements are relatively deep, preferably having depths which lie in a range from about 0.8 to about 2.5 times the wavelength of visible light. The exact optimum depth is dependent on the period of the grating elements, $\Lambda$, on the optical constant, $n_s$, of the grating material, and on the center of the selected wavelength band, $\lambda_0$. The formulae derived for thick volume holograms by H. Kogelnik in his paper on coupled wave theory (see Bell System Technical Journal 48, 2909, 1969) can now be shown in accordance with the invention to apply also quite well to deep relief grating elements. The grating elements have a period, $\Lambda$, which period determines the direction of outgoing light transmitted through the grating structure for given angles of incidence of the incident light thereon as can be determined by the use of the well-known grating equation, to be discussed below as Eq. (1).

In preferred embodiments of the invention, the grooves of the grating elements are slanted at a selected angle with respect to a direction orthogonal to the plane of the grating structure substrate, the slant angle being selected in accordance with the expected range of incident angles of the incoming light being supplied to the grating structure for re-direction therethrough. Such slant angles typically lie within a range from 0°, for a deep but non slanted structure, to about 15° for a structure having a relatively large slant angle.

Such grating structures can normally be oriented in a window, for example, so that the grating structure is arranged in a substantially horizontal manner, e.g., so that the grooves in the structure are substantially parallel to the ceiling or to the floor of the room into which the light is to be directed. Such orientation, however, can also be arranged to be tilted with respect to the horizontal, the tilt angle being selected so that the azimuth angle of the redirected light changes, as might be required, for example, to correct for windows that are not facing directly south. In this way, light which might have been redirected by a horizontally oriented grating structure toward the walls of a room can be more advantageously redirected as desired to the ceiling thereof by suitable tilting of the grating structure relative to the horizontal.

BRIEF DESCRIPTION OF THE DRAWING

The invention can be described in more detail with the help of the accompanying drawings wherein:

FIG. 3 shows a diagrammatic view of an alternative embodiment of the invention using an exemplary array of grating structures;

FIG. 6 shows a further alternative embodiment of an exemplary grating structure in accordance with the invention.

DETAILED DESCRIPTION

In order to better understand the invention disclosed herein, it is helpful to provide an understanding of the rationale for providing such slanted groove structures and then to describe a typical example of how to select desired selected slant angles in practical designs. Such designs require the use of the well-known grating equation, as well as the use of Snell's law of refraction. For a more detailed quantitative understanding of an even more refined basis for such design the use of Kogelnik's theory, well-known to the art, can also be used.

Figure 1:
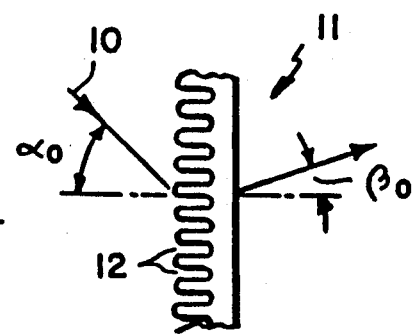
FIG. 1 shows a typical embossed grating structure of the prior art.

In a typical example, let it be assumed that the design requires the diffraction grating to diffract light having a wavelength which lies generally in the center of the visible spectrum, e.g. green light having a wavelength $\lambda$ of 0.55 microns. As shown in FIG. 1, such incoming light 10, for example, is incident upon a diffraction grating structure 11 having non-slanted grating elements 12 at an incidence angle of $\alpha_o$ and is diffracted and re-directed therefrom as outgoing light at an angle $\beta_o$ as shown. The angles $\alpha_o$ and $\beta_o$ are determined relative to the horizontal, i.e., the direction orthogonal to the plane of the diffraction grating structure. The period of the elements is specified as $\Lambda$ and the relationship among such quantities is expressed in accordance with the known grating equation as $$\Lambda(\sin \alpha_o + \sin \beta_o) = \lambda \quad (1)$$

If $\alpha_o = \beta_o$, the expression reduces to $$\Lambda = \lambda/2 \sin \alpha_o \quad (2)$$

For a period $\Lambda$, maximum diffraction efficiency is achieved when $\alpha_o = \beta_o$, such grating having elements which are non-slanted and which lie in the horizontal direction (i.e., in a direction orthogonal to the plane of the grating structure substrate), as shown. The value of $\beta_o$ can also be calculated for cases where $\alpha_o \neq \beta_o$, using Eq. (1) but the efficiencies for such cases is less than that for the case where $\alpha_o = \beta_o$.

It may be desired, for example, to design a diffraction grating for directing incoming light through the grating into a room in a direction such that most of the light is directed relatively deeply into the interior of the room, e.g. at an angle $\beta_o = 15°$, when the incoming light incident upon the grating structure is at an incident angle $\alpha_o = 40°$, for example. Such a condition may be a typical one where incoming sunlight, for example, is incident on the grating structure at such an angle, $\alpha_o$, and it is desired to diffract such light into the far side interior of the room, such as shown diagramatically in FIG. 1. In such a case Eq. (1) can be used to determine the grating period $\Lambda$ as follows $$\Lambda = \frac{0.55}{\sin 40° + \sin 15°} = 0.61 \text{ microns}$$

where the grating uses unslanted grating elements and $\lambda$ is selected as 0.55 microns (i.e., green light) substantially in the center of the visible spectrum. The efficiency under such conditions would be relatively less than that achievable when $\alpha_o = \beta_o$. For example, for a grating with $\Lambda = 0.61$ microns and $\alpha_o = \beta_o$, about 90% of the maximum efficiency can be achieved when $\alpha_o = -\beta_o = 26.8°$ if the optimum groove depth, d, using Kogelnik's theory, is chosen. This symmetrical condition of maximum efficiency is sometimes referred to as the "Bragg condition" in an analogy with x-ray diffraction by crystals.

The depth d can be determined in accordance with Kogelnik's theory applied to these relief structures. Thus, the optimum depth, d, can be determined from the following formula:

$$d = \frac{\lambda \cos \alpha}{n_s - 1}$$

where $\lambda$ is the wavelength of light (in air) for which the optimum efficiency is desired, $\alpha$ is the incident angle, and $n_s$ is the refractive index of the groove material. In a practical example for green light (where $\lambda = 0.5 \mu m$), using relative angles, i.e., $\cos \alpha$ is between 1.0 and 0.8, and using a typical dielectric material where $n_s$ is between 1.5 and 1.7, the optimal depth would be about 1.5 $\lambda$ or about 0.75 $\mu m$. In some cases a value other than this exact optimal depth value may be used for certain practical reasons. For example, one may want to make the groove depth somewhat less than the optimal value because it may be technically easier to form a more shallow groove (i.e., relatively deep embossing may prove difficult) or because a less than optimally deep structure may be more efficient over a wider range of incident angles than is provided by the optimally deep structure.

On the other hand, one may want to make the groove depth somewhat greater than the optimal value if one wants most of the efficiency at the longer wavelength (i.e., in the red region) and wants the efficiency to decrease relatively rapidly with the incident angle. For such purpose, using a material with a refractive index $n_s = 1.5$, one might select a depth $d = 1.2 \mu m$, for example, rather than 0.75 $\mu m$.

In view of the above considerations, a preferred groove depth may range from about 0.8 to about 2.5 times the wavelength of visible light.

In accordance with the invention it has been found that the efficiency can be substantially increased for such conditions wherein $\alpha_o \neq \beta_o$ if the planes of the grating elements are slanted, or tilted, with reference to the horizontal, i.e., at a slant angle $\phi$, as discussed below. Such an approach can be explained using the drawing of FIG. 2.

As seen therein, a grating structure 15, having an average refractive index $n_a$, has an input plane 16 and an output plane 17. Incoming light is incident on the grating at the input plane at an incident angle $\alpha_o$ with the horizontal. The incoming light is refracted at the input plane and is re-directed within the interior of the grating material at an angle $\alpha_i$ and is thereupon diffracted within the interior of the structure at an angle $\beta_i$, as shown. The light is thereupon further refracted at the plane 18 where the grating elements interface with the solid portion 19 of the substrate and finally is again refracted at the output plane 17 at an angle $\beta_o$.

In order to achieve maximum efficiency wherein $\alpha_o \neq \beta o$, the grating structure elements must be slanted at an angle $\phi$ with respect to the horizontal, as can be better understood in the discussion of a typical example below.

In such a typical example, as explained with reference to FIG. 2, the refractive index $n_s$ of the solid portion 19 of the structure is about 1.5 and the refractive index $n_a$ at the grating element portion 15 of the grating structure is about 1.25, namely, the average of the refractive index of the grating elements and of air therebetween.

Figure 2:
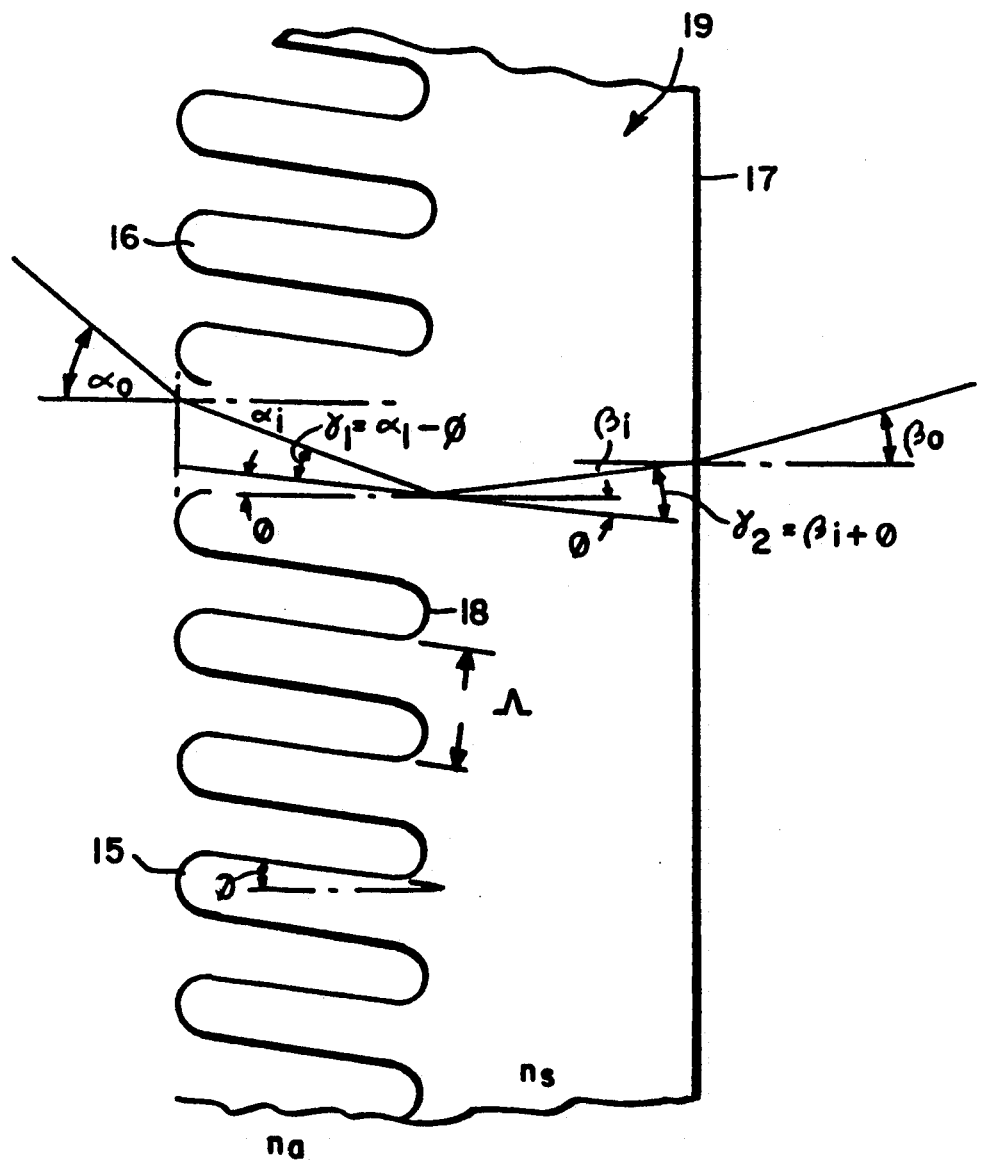
FIG. 2 shows a diagrammatic view of an embodiment of a slanted grating structure in accordance with the invention.

In FIG. 2, the incident angle of incoming light is $\alpha_o$ and the exit angle of the outgoing light is $\beta_o$. The slant angle of the grating elements is $\phi$. The interior refractive angle at the input plane 16 of the grating is $\alpha_i$ and the interior refractive angle at the outgoing plane 17 is $\beta_i$. It is found that for maximum efficiency in accordance with the invention the angles $\gamma_1$ and $\gamma_2$ must be equal, where $\gamma_1 = \alpha_i - \phi$ and $\gamma_2 = \beta_i + \phi$, as shown. These relationships represent a generalized "Bragg condition" for slanted gratings. From these relationships, it follows that $\phi = \frac{1}{2}(\alpha_i - \beta_i)$.

Using Snell's law $$\sin \alpha_i = \sin \alpha_o/n_a$$

$$\sin \beta_i = (n_s/n_a)(\sin \beta_o/n_s) = \sin \beta_o/n_a$$

For $\alpha_o = 40°$, $\beta_o = 15°$, and $n_a = 1.25$, values of $\alpha_i = 30.95°$ and $\beta_i = 11.95°$ are obtained. In accordance with the desired criterion for efficiency using grating elements at a slant angle of $\phi$, the angles $\alpha_i - \phi$ and $\beta_i + \phi$ must be equal as mentioned above and in such case the slant angle $\phi = \frac{1}{2}(\alpha_i - \beta_i)$ which is 9.5° for the above $\alpha_i$ and $\beta_i$ values. To calculate the grating element period $\Lambda$ required for the slanted grating elements, the grating equation is used for the wavelength $\lambda_i$ within the interior of the grating structure (wherein $\lambda_i = \lambda_o/n_a = 0.55/1.25 = 0.44$ micron)

$$\begin{aligned}\Lambda &= \lambda/2 \sin(\alpha_i - \phi) \\ &= 0.44/2 \sin(30.95° - 9.515°) \\ &= 0.60 \text{ microns}\end{aligned}$$

Thus, for the example under discussion, the grating elements are formed so as to be at a slant angle of 9.5° with respect to the horizontal and the period $\Lambda$ is 0.60 microns, as shown in FIG. 2, thereby providing maximum grating efficiency for incoming green light ($\lambda_o = 0.55$ microns) at an incident angle $\alpha_o$ of 40° to provide outgoing light from the diffraction grating structure at an output angle $\beta_o$ of 15°.

The above calculations can be made at any selected wavelength $\lambda$ (e.g., light in the red, the green, or the blue-violet portions of the visible spectrum) and for any incidence angle $\alpha_o$ so as to produce any desired output angle $\beta_o$ with maximal efficiency.

In designing a diffraction grating structure it is clear that compromises and trade-offs must be made. For example, it is desired to achieve effective use of such grating structures in a window for a reasonable range of incident angles of incoming sunlight containing light over the entire visible spectrum. For such purpose it is most effective to use an array of grating structures, each designed to respond maximally to incoming light at a selected incident angle in a different selected portion of the spectrum and to re-direct such light so that a large fraction of the light at the wavelength of the spectrum to which each grating structure of the array responds maximally, is re-directed towards the same selected interior region of a room where the colors effectively mix to produce white light at such region. The remaining light of different wavelengths (i.e. different colors) from each structure of the array is re-directed toward other interior regions of the room. It is also found that, if the structure is so designed for efficiently re-directing visible light at one selected incident angle, the efficiency will remain usefully high for re-directing visible light over a reasonable range of other incident angles about such one selected incident angle, e.g. for incoming sunlight whose angle of incidence varies during the course of a day and from season to season. Such an approach can be understood in the context of a three element diffracting grating array as shown in FIG. 3, for example, which is designed to produce a significant amount of spectral overlap, thereby producing white light at the region desired.

As seen therein, an exemplary array 30, 31, 32 of diffracting grating structures comprises a diffracting structure 33 designed for responding primarily to incoming light in the red portion of the visible spectrum, a diffracting structure 31 designed for the green portion thereof, and a diffracting structure 32 designed for the blue-violet portion thereof. An overall design is chosen to respond to incoming light 34 (e.g., incoming sunlight) at a selected incident angle $\alpha_o$ where it is desired that outgoing white light be re-directed generally toward a selected interior region 35 of a room. The diffracting structures are each designed so as to re-direct the light at the primary wavelength associated with each structure so that such light is directed at selected output angles $\beta_{or}$, $\beta_{og}$, $\beta_{ob}$ toward region 35 so that the maximum amount of white light is directed toward such region.

For such purpose diffracting structure 30 is arranged to re-direct red light at an angle $\beta_{or}$, diffracting structure 31 is arranged to re-direct green light at an angle $\beta_{og}$, and diffraction structure 32 is arranged to re-direct blue-violet light at an angle $\beta_{ob}$. Accordingly, an effective mixing thereof generally occurs at region 35 and a maximum amount of white light is effectively produced thereat as desired. In each case the remaining light through a structure at wavelengths in the visible spectrum for which the particular diffracting structure has not been primarily designed will also be re-directed (as shown by dashed lines) so that some light of various colors is re-directed to other regions of the interior of the room. Since the diffraction efficiencies of the structures for such remaining light is substantially lower than for the desired primary wavelength for which a structure is designed in each case, the visual effect of such remaining light of various colors is considerably reduced in comparison with that of the white light at region 35 and should not provide any significant distraction, for example, to persons present in the room.

In each case, the desired output angles, $\beta_{or}$, $\beta_{og}$, and $\beta_{ob}$, once selected, permit the grating slant angle and period for each structure to be designed in accordance with the principles described above for a desired angle of incidence $\alpha_o$. It is found that appropriate selection of such design for maximizing the efficiency for a particular incident angle also provides satisfactory efficiencies over a relatively wide range of incident angles about the selected incident angle. For example, if the designs of such structures are such that the efficiencies thereof are maximized for an incident angle of 40°, the efficiencies of the designs remain generally satisfactory over a range of incident angles of 40° ±20°, for example, which normally would provide acceptable operation for responding to changes in the direction of incoming sunlight throughout most of the year. Accordingly, by using a design approach as discussed above for slanted diffraction grating elements, one can provide an effective and highly efficient window design for considerably enhancing the interior lighting of a room.

An alternative to the array structure of FIG. 3 is shown in FIG. 6 wherein the three diffracting components 30, 31, 32 are replaced by a single diffracting structure 60 in which each of the diffracting elements is at a selected slant angle $\phi$, the slant angles as well as the grating period $\Lambda$ varying in a continuous manner from one end of the structure to the other. Thus, in the embodiment of FIG. 6, the slant angles and grating periods vary from a maximum slant angle $\phi_{MAX}$ for an structure 61 at one end 62 thereof to a minimum slant angle $\phi_{MIN}$ for an element 63 at the other end 64 thereof, the slant angles for elements in between varying in a continuous manner at values between $\phi_{MAX}$ and $\phi_{MIN}$ and the grating periods varying between $\Lambda_{MAX}$ and $\Lambda_{MIN}$. Such a structure would provide a smoother blending of colors so as to provide, for example, a smooth transition from a region where the colors effectively mix to form a white region to generally non-white regions.

Fabrication of such diffraction structures of the invention can be performed in accordance with the following exemplary technique, although other techniques and designs for forming such structures can also be devised within the skill of those in the art.

A relief grating configuration is recorded holographically using a positive photoresist material, such as a material sold by Shipley Company of Newton Massachusetts under the designation AZ1400-31. The photoresist material is spincoated on a cleaned substrate and, after spinning for about ten seconds at a relatively slow speed of 2000 RPM and baking for 0.5 hours at 80° C., a photoresist layer of thickness between 2 and 3 micrometers ($\mu$m.) is obtained, such layer being sufficiently thick to serve as a substrate for the desired relatively deep holographic grating.

The grating elements are produced in the photo resist layer by placing the coated slide in an interference pattern formed by two plane waves from a laser operating in the violet part of the visible spectrum, having, for example, a wavelength of 458 nm. and a power of 40 mwatt., such as can be obtained from commercially available argon ion lasers. With a total light intensity of about 0.25 mwatt/cm.$^2$ at the surface of the photoresist material and a twenty to thirty minute exposure time, such exposure results in an amount of energy of 0.3 joules/cm.$^2$ at the photoresist surface. Other more powerful lasers can, of course, also be used and are preferable due to the shorter exposure times required. After exposure, the photoresist material is developed in a suitable microposit developer for one to three minutes in order to obtain maximum brightness of the diffraction. Development is terminated by plunging the grating into water, air drying the wet grating, and subsequently exposing the air dried grating for about 5 minutes to a 300 watt ultraviolet black light at a wavelength of 365 nm. The latter exposure converts the yellowish colored photoresist material to virtually a colorless state which is important in order to reduce absorption of radiation so as to provide a treatment which renders the grating elements very transparent for visible light. Experiment has shown that exposure to the ultra violet black light as discussed above significantly reduces absorption of visible light at wave-lengths of interest and the resultant absorption characteristic of grating elements is held to at below 2%.

As mentioned above, grating elements are made by providing an interference pattern of two plane waves at selected angles with respect to each other. Thus, for unslanted grating elements two laser beams are used at equal and opposite angles with respect to the substrate normal. For slanted grating elements, two laser beams making unequal and opposite angles with the substrate normal are used.

The grating elements fabricated as described above have been found to function very effectively for the intended purposes discussed. In general, however, it is desirable to prepare them in a form usuable for embossing techniques. Such a procedure is well known to the art and includes the process of electroplating the photoresist grating with metal and then separating the photoresist from the metal. In this way, a metal master can be created which master can be pressed into thermoplastic material to form the desired grating structure. Since the grating elements described here are slanted, however, the usual embossing technique wherein the master presses on the thermoplastic in a direction of the grating element and is perpendicular to the surface thereof preferably can be modified so that embossing is arranged to occur along the slant direction. Such modification causes a minimum of disturbance in the formation of the grating element and is thus a preferred method of embossing.

Figure 4A:
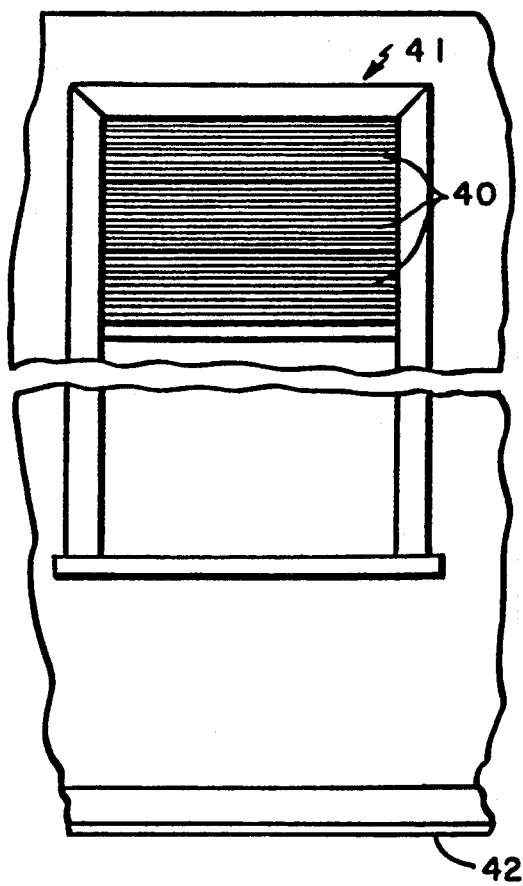
FIG. 4A and 4B show two views of embodiments of the Invention as used in window structures.

A plurality of grating structures discussed above can normally be oriented in a window structure in a substantially horizontal manner, as shown in FIG. 4A, for example, wherein grating structures 40 are arranged in a window 41 so that the grooves in the grating elements thereof are substantially parallel to the floor 42 of a room in which the window is used. In such a horizontal orientation, the grating structures change the altitude direction of the incoming light, as discussed above and shown in FIG. 2, for example. Thus, instead of permitting the light to continue downwardly through the structure it redirects the light upwardly toward the ceiling of the room interior, as desired. The azimuth angle of the incoming light, however, is essentially unchanged.

Figure 4B:
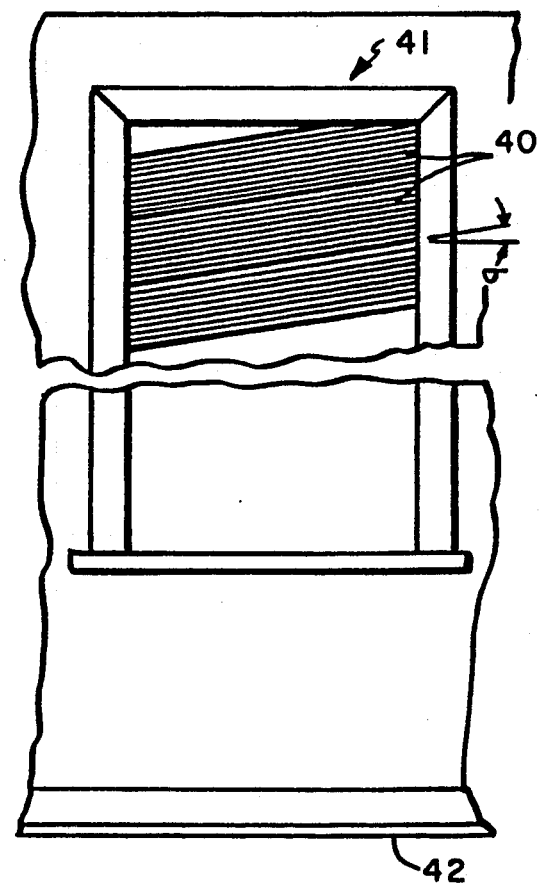

By rotating the grating structure within the window so as to tilt the grating elements away from the horizontal, as shown by an angle $\sigma$, in FIG. 4B, however, the azimuth angle can be affected as may be desired in some applications. Such orientation modification provides a correction for windows that are not positioned so as to face directly south. In such a case, for example, incoming light at noon time, for example, might normally be redirected toward a wall of the room when using a horizontal orientation. However, by rotating the grating structures the light can be redirected toward the ceiling of the room, as desired. Moreover, by suitably permitting the angle of orientation to be changed, e.g., manually, in a window installation, the most effective redirection of the incoming light can be arranged to be concentrated near the center of the ceiling region of the room near noon time, in the face of azimuthal changes of the incoming sunlight before such changes cause the light to be redirected toward a side wall as the azimuth angle varies. In general, it is found that rotation or tilt angles up to about ±20° are preferred, although in cases of relatively large deviations of window positions from a direct southward orientation even larger rotation angles may be useful.

Figure 5:
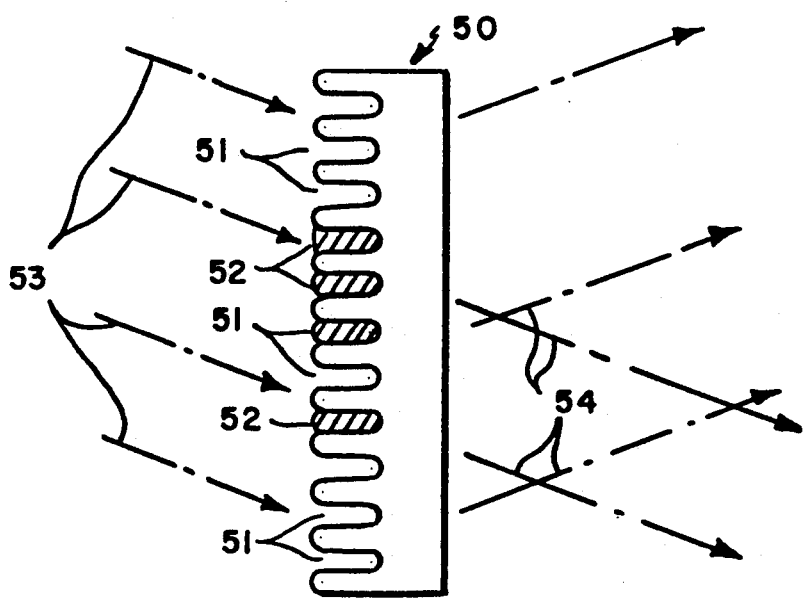
FIG. 5 shows an alternative embodiment of an exemplary grating structure in accordance with the invention.

In another modification of the grating structure of the invention, the diffraction operation at certain regions of the grating structure can be rendered ineffective by filling in the spacings between the elements with plastic so that the structure at such regions merely acts to provide a relatively straightforward transmission of light substantially without change in direction and intensity. As shown in FIG. 5, structure 50 has grating elements 51. By filling the space between certain of the grating elements with plastic, essentially solid regions 52 can be formed.

Such latter regions can be arranged so that when viewed from within the room they form one or more symbols or one or more letters, or words, or combinations thereof, which when illuminated by incoming sunlight (shown by the incoming dashed lines 53) can be seen in relativley bright outline, surrounded by relatively dark background regions where the grating elements redirect the sunlight toward the ceiling of the room as desired, as shown by the outgoing dashed lines 54.

Other modifications and uses of the embodiments described above within the spirit and scope of the invention may occur to those in the art and, hence, the invention is not to be construed as limited to the particular embodiments shown and described above, except as defined by the appended claims.

What is claimed is:

1. A diffraction grating structure comprising
 a substrate having a grating portion at an input surface thereof and an adjacent solid portion at an output surface thereof;
 a plurality of diffracting elements formed in said grating portion, each of said diffracting elements including grooves having a selected depth which depends on a selected design wavelength $\lambda$ of incoming radiation impinging thereon, the diffracting elements being formed at a selected slant angle $\phi$ with reference to a direction orthogonal to the plane of the input surface of said grating portion.

2. A diffraction grating structure in accordance with claim 1 wherein the selected slant angle $\phi$ is determined in accordance with the following relationship:

$$\phi = \tfrac{1}{2}(\alpha_i - \beta_i)$$

where $\alpha_i$ is the angle, with reference to the direction orthogonal to said input surface, at which incoming radiation is redirected within the interior of said grating portion as a result of the refraction of said incoming radiation at said grating portion and $\beta_i$ is the angle, with references to said orthogonal direction, at which said radiation is further redirected from said grating portion within the interior of said solid portion by diffraction at the interface between said grating portion and said solid portion.

3. A diffraction grating structure in accordance with claims 1 or 2, wherein said structure is arranged so that said incoming radiation enters said grating portion at an angle $\alpha_o$ with reference to the direction orthogonal to said input surface and said radiation exits from the output surface of the solid portion at an angle $\beta_o$, the period $\Lambda$ of the diffracting elements being determined in accordance with the following relationship:

$$\Lambda = \frac{\lambda}{\sin\alpha_o + \sin\beta_o}$$

4. A diffraction grating structure in accordance with claim 1 wherein said selected slant angle lies in a range from 0° to about 15°.

5. A diffraction grating structure in accordance with claim 1 wherein said selected depth lies in a range from about 0.8 to about 2.5 times said selected wavelength.

6. A diffraction grating structure in accordance with claim 2 wherein $$\sin \alpha_i = \sin \alpha_o / n_a$$

where $n_a$ is the average refractive index of said grating portion.

7. A diffraction grating strtucture in accordance with claim 2 wherein $$\sin \beta_i = \sin \beta_o / n_a.$$

8. A diffraction grating structure in accordance with claim 1 wherein said selected wavelength $\lambda$ is in the visible spectrum of light radiation.

9. A diffraction grating structure in accordance with claim 8 wherein said selected wavelength is selected as the wavelength at the center of either the red, the green, or the blue-violet portions of the visible spectrum.

10. A diffraction grating system comprising a plurality of a diffraction grating structures in accordance with claim 3 wherein the plurality of grating structures are arranged so that incoming radiation enters each structure at an angle $\alpha_o$ with reference to the input surfaces thereof, the selected slant angles and period of a first group thereof being chosen to redirect incoming radiation in a first portion of the visible spectrum so as to exit at the output surfaces thereof at a first exit angle $\beta_{o1}$, the selected slant angles and period of a second group thereof being chosen to redirect incoming radiation in a second portion of the visible spectrum so as to exit at the output surfaces thereof at a second exit angle $\beta_{o2}$, and the selected slant angles and period of a third group thereof being chosen to redirect incoming radition in a third portion of the visible spectrum so as to exit at the output surfaces thereof at a third exit angle $\beta_{o3}$.

11. A diffraction grating system in accordance with claim 10 wherein said first, second, and third portions of the visible spectrum are the red, green, and blue-violet portions thereof.

12. A diffraction grating system in accordance with claim 11 wherein said system is positioned in a window of a room so that incoming sunlight radiation is redirected within the interior of the room in a manner such that white light is produced at a selected interior region of said room.

13. A diffraction grating system in accordance with claim 12 wherein the grating structures are positioned in said window so that the grooves therein are substantially parallel to the plane of the floor of said room.

14. A diffraction grating system in accordance with claim 12 wherein the grating structures are positioned in said window so that the grooves therein are at a selected angle with reference to the plane of the floor of said room.

15. A diffraction grating structure in accordance with claim 3 wherein each of the diffracting elements thereof has a different slant angle and a different period, the values of said slant angles and said periods varying from a maximum slant angle and a maximum period at one end of said structure to a minimum slant angle and a minimum period at the other end of said structure.

16. A diffraction grating structure in accordance with claim 1 wherein selected ones of said grooves are filled with material having a refractive index substantially the same as that of air so that incoming radiation passes through said selected ones of said grooves substantially without change in direction and intensity.

* * * * *